United States Patent [19]

Bogdany

[11] 4,368,282

[45] Jan. 11, 1983

[54] CARPET BACKING ADHESIVE

[75] Inventor: John Bogdany, Fort Oglethorp, Ga.

[73] Assignee: The General Tire & Rubber Company, Akron, Ohio

[21] Appl. No.: 276,102

[22] Filed: Jun. 17, 1981

[51] Int. Cl.³ ............................ C08L 25/18; C09J 3/12
[52] U.S. Cl. ........................................ 524/58; 428/95; 428/96; 428/97; 524/915
[58] Field of Search ................. 260/17.4 R, 17.4 SG, 260/742, 749; 428/95, 96, 97, 261, 265; 427/390 R; 524/58, 915

[56] References Cited

U.S. PATENT DOCUMENTS

| | | | |
|---|---|---|---|
| 2,018,524 | 10/1935 | Holmberg | 428/96 |
| 2,373,597 | 4/1945 | Purdon | 260/742 |
| 2,637,095 | 5/1953 | Mersereau | 428/96 |
| 3,324,067 | 6/1967 | Donaldson et al. | 524/915 |
| 4,009,310 | 2/1977 | Scobbo | 428/95 |
| 4,098,944 | 7/1978 | Pollock | 428/96 |

*Primary Examiner*—V. P. Hoke

[57] ABSTRACT

Corn syrup is used to extend and stiffen carpet backing adhesive containing a carboxylated styrene butadiene copolymer latex.

2 Claims, No Drawings

CARPET BACKING ADHESIVE

The invention relates to a carpet backing adhesive. A primary backing holds the tufts of fibers of a carpet together. The primary backing is laminated by pressure to the secondary fibers or woven backing by use of an adhesive.

Carpet backing adhesives make it possible to adhere the fiberous surface of a carpet to a backing, adhere the fibers in the carpet surface to each other at their base and adhere the primary backing of a carpet to a secondary backing which serves as a dimentional stabilizer. Details relating to carpets, and backings and carpet backing adhesives are well-known in the art and will not be discussed in detail here. For background information, particularly related to carpet backing adhesives, see U.S. Pat. No. 4,009,310 Scobbo 1977. As can be seen from the patent, many of the carpet backing adhesives are derived from petroleum. This is particularly true of the styrenebutadiene copolymer adhesives. The principal source of the styrene is petroleum. It is the styrene portion of the adhesive that provides the hand or stiffness to the carpet backing. Starch has also been added to carpet backing adhesive to stiffen it.

There are many problems involved with the use of styrene in carpet backing adhesive. Being dependent upon petroleum, price, and availability fluctuate with the political situation in the Near East. The present invention alleviates the problem to some degree by reducing the need for styrene or related materials to stiffen a carpet by a carpet backing adhesive. There are also problems involved in using starch as a carpet backing adhesive. One of the problems involves solubilizing the starch in water for application.

The advantage offered by the invention is that the styrene or other conventional stiffening agent of a carpet backing adhesive can be replaced by corn syrup. Depending on use, the corn syrup can be present at a level of from 1 to 30 parts of syrup per hundred parts of conventional adhesive. Parts are parts by weight based upon solids content. The corn syrup is preferably present at a level of from about 5 to 10 parts of corn syrup per hundred parts of adhesive. The degree of conversion of the corn syrup is not critical. The corn syrup is readily soluable in water.

A number of carpet backing adhesives were formulated using various carpet backing adhesive latices in combination with a number of different corn syrups at various solid levels. A total solids level for the adhesive compound of the carpet backing adhesive is from about 30 to 85 percent, preferably from 70–82 percent. In the following examples, the three below-identified corn syrups were employed.

TABLE I

| Corn Syrup: | Staley 200 | Staley 1300 | Sweetose 4300 |
|---|---|---|---|
| Degree of Conversion | Very low | Regular | High |
| Type of Conversion | Acid-enzyme | Acid | Acid-enzyme |
| Dextrose Equivalent (D.E.), % | 26 | 43 | 64 |
| Fermentable Extract (F.E.), % | 23 | 42 | 76 |
| Dextrose (Mono saccharides), % | 5 | 20 | 39 |
| Maltose (Disaccharides), % | 14 | 14 | 33 |
| Malto triose (Trisaccharides), % | 14 | 12 | 12 |
| Higher Saccharides, % | 67 | 54 | 16 |
| Baume at 100° F. | 42 | 43 | 43 |
| Total Solids, % | 77.5 | 80.3 | 81.8 |
| Moisture, % | 22.5 | 19.7 | 18.2 |

TABLE I-continued

| Corn Syrup: | Staley 200 | Staley 1300 | Sweetose 4300 |
|---|---|---|---|
| pH | 5 | 5 | 5 |
| Acidity as HCl, % | 0.015 | 0.015 | 0.015 |
| Viscosity, Poises @ 100° F. | 220 | 125 | 55 |

Urea was optionally present in some of the formulations. Urea improved wet adhesives and also improved tuft lock. Tuft lock is the adhesion of the tufts of fibers to the primary backing and to themselves. The carpet backing adhesives of the following examples were applied as a froth using conventional application technique.

TABLE IIa

| VARIABLES: | | | | | | |
|---|---|---|---|---|---|---|
| Carboxyl containing 50–50 SBR (50%) | 200 | 190 | 180 | 190 | 180 | 190 |
| Staley 200 (77.5%) | — | 6.5 | 12.9 | 3.2 | 6.5 | — |
| Staley 1300 (80.3%) | — | — | — | — | — | 6.2 |
| Urea (50%) | — | — | — | 5.0 | 10.0 | — |
| Ammonium Lauryl Sulfonate-Soap | 1.7 | | | | | |
| CaCo3 | 425 | | | | | |
| H2O | 10 | 14 | 17 | 12 | 14 | 14 |
| Poly Acrylate Thickner | 1.85 | 2.1 | 2.3 | 2.15 | 2.5 | 2.15 |
| Carpet Secondary Adhesion Dry | 8.7 | 7.0 | 9.0 | 11.8 | 6.5 | 8.2 |
| TUFT LOCK (lbs./Tuft) | 12.8 | 11.6 | 14.3 | 9.3 | 8.6 | 11.2 |

TABLE IIb

| VARIABLES: | | | | | | |
|---|---|---|---|---|---|---|
| Carboxyl containing 50–50 SBR (50%) | 180 | 190 | 180 | 190 | 180 | 190 |
| Staley 1300 (80.3%) | 12.5 | 3.1 | 6.2 | — | — | — |
| Sweetose 4300 (81.8%) | — | — | — | 6.1 | 12.2 | 3.1 |
| Urea (50%) | — | 5.0 | 10.0 | — | — | 5.0 |
| Ammonium Lauryl Sulfonate-Soap | 1.7 | | | | | |
| CaCo3 | 425 | | | | | |
| H2O | 18 | 12 | 14 | 14 | 18 | 12 |
| Poly Acrylate Thickner | 2.3 | 2.2 | 2.45 | 2.1 | 2.3 | 2.15 |
| Carpet Secondary Adhesion Dry | 8.0 | 9.7 | 7.6 | 10.8 | 7.9 | 8.1 |
| TUFT LOCK (lbs./Tuft) | 12.7 | 12.2 | 10.3 | 11.9 | 10.5 | 11.1 |

TABLE IIc

| VARIABLES: | |
|---|---|
| Carboxyl containing 50–50 SBR (50%) | 180 |
| Sweetose 4300 (81.8%) | 6.1 |
| Urea (50%) | 10.0 |
| Ammonium Lauryl Sulfonate-Soap | 1.7 |
| CaCo3 | 425 |
| H2O | 14 |
| Poly Acrylate Thickner | 2.4 |
| Carpet Secondary Adhesion dry | 6.9 |
| TUFT LOCK (lbs./Tuft) | 10.7 |

As will be noted from the above examples, corn syrup extended carpet backing adhesive is equivalent in the adhesion (dry) to the unextended carpet backing adhesive. The corn syrup extended adhesives also lead to the desired stiffer product (hand).

In the claim as elsewhere, parts of carpet backing adhesive refer to the conventional adhesive component of the carpet backing adhesive formulation. Carpet backing adhesives include among others, water based systems of polyvinyl acetates, polyacrylates, polyethylene-vinyl acetate copolymers, styrenebutadiene copolymers (SBR), and/or carboxy styrene-butadiene copolymers. See U.S. Pat. No. 4,009,310 for an expansion of the definition.

The adhesion test employed was FHA-UM 44-C, a standard test used in the carpet industry.

In the claim, as elsewhere, parts refer to parts by weight based on dry solids, as the term is generally used in the latex industry.

I claim:

1. In a carboxylated styrene butadiene copolymer latex based carpet backing adhesive, free of starch, the improvement comprising extending said adhesive without significant loss of tuft lock by including as an additional component of said adhesive from 1 to 30 parts by weight, based on the adhesive solids content, of a water soluble corn syrup.

2. The adhesive of claim 1 wherein 5 to 20 parts of corn syrup are present.

* * * * *